(12) United States Patent
Diao et al.

(10) Patent No.: US 9,584,051 B2
(45) Date of Patent: Feb. 28, 2017

(54) METHOD FOR ESTIMATING THE ANGULAR POSITION OF THE ROTOR OF A POLYPHASE ROTARY ELECTRICAL MACHINE, AND APPLICATION TO THE CONTROL OF A POLYPHASE INVERTER FOR SUCH A MACHINE

(71) Applicant: VALEO EQUIPEMENTS ELECTRIQUES MOTEUR, Creteil (FR)

(72) Inventors: Sidath Diao, Saint-Maur des fossés (FR); Zaatar Makni, Chilly Mazarin (FR)

(73) Assignee: Valeo Equipements Electriques Moteur (FR)

( * ) Notice: Subject to any disclaimer, the term of this patent is extended or adjusted under 35 U.S.C. 154(b) by 0 days.

(21) Appl. No.: 14/889,340

(22) PCT Filed: May 12, 2014

(86) PCT No.: PCT/FR2014/051079
§ 371 (c)(1),
(2) Date: Nov. 5, 2015

(87) PCT Pub. No.: WO2014/184472
PCT Pub. Date: Nov. 20, 2014

(65) Prior Publication Data
US 2016/0094166 A1     Mar. 31, 2016

(30) Foreign Application Priority Data

May 13, 2013   (FR) ...................................... 13 54239

(51) Int. Cl.
*H02P 6/18*      (2016.01)
*H02P 6/16*      (2016.01)
(Continued)

(52) U.S. Cl.
CPC ................ *H02P 6/18* (2013.01); *H02P 6/165* (2013.01); *H02P 21/13* (2013.01); *H02P 21/18* (2016.02)

(58) Field of Classification Search
CPC .. H02P 21/13; H02P 21/18; H02P 6/00; H02P 6/18; H02P 21/24; H02P 27/12
(Continued)

(56) References Cited

U.S. PATENT DOCUMENTS 5,569,994 A * 10/1996 Taylor ....................... H02P 6/18
                                                         318/700
7,002,318 B1 * 2/2006 Schulz .................. B60L 3/0038
                                                         318/437
(Continued)

OTHER PUBLICATIONS

S. Diao, D. Diallo, Z. Makni, C. Marchand and J. F. Bisson, "A differential algebraic approach for position/speed estimation in PMSM," 2013 International Electric Machines & Drives Conference, Chicago, IL, 2013, pp. 1149-1154. URL: http://ieeexplore.ieee.org/stamp/stamp.jsp?tp=&arnumber=6556304&isnumber=6556119.*

(Continued)

*Primary Examiner* — Bentsu Ro
*Assistant Examiner* — Said Bouziane
(74) *Attorney, Agent, or Firm* — Berenato & White, LLC

(57) ABSTRACT

According to the method of the invention, the estimation of the angular position is obtained by calculating at least one first estimator as solution of a differential algebraic equation whose coefficients depend on electric parameters of the rotating electric machine comprising first and second inductances of a stator respectively along a direct axis and a quadrature axis with respect to a magnetic flux produced by the rotor of the machine, a resistance of a phase winding and the magnetic flux produced by the rotor. The coefficients also depend on a reference voltage of a vector pulse width (Continued)

modulation (10) applied to the stator of the machine, on phase currents and on first derivatives with respect to time of these phase currents. The estimation of the speed of rotation is obtained by calculating a second estimator obtained by a calculation of first derivative of the first estimator with respect to time.

14 Claims, 4 Drawing Sheets

(51) Int. Cl.
  *H02P 21/13* (2006.01)
  *H02P 21/00* (2016.01)
(58) Field of Classification Search
  USPC .................................................. 318/400.02
  See application file for complete search history.

(56) References Cited

U.S. PATENT DOCUMENTS

| | | | | |
|---|---|---|---|---|
| 7,265,507 B1* | 9/2007 | Markunas | ............... | H02P 21/06 318/400.02 |
| 7,456,537 B1* | 11/2008 | Kascak | ............... | F16C 32/0446 310/113 |
| 7,579,804 B2* | 8/2009 | Iotti | ........................ | H02P 6/182 318/772 |
| 2002/0149337 A1* | 10/2002 | Thomas | .................. | H02P 21/06 318/700 |
| 2008/0211450 A1* | 9/2008 | Yamada | .............. | H02P 23/0027 318/801 |
| 2011/0025241 A1* | 2/2011 | Kwon | ................. | H02P 21/0017 318/400.04 |
| 2011/0241586 A1* | 10/2011 | Tobari | ..................... | H02P 21/22 318/400.23 |

OTHER PUBLICATIONS

Chen J-L et al: "Design and implementation of a novel high-performance sensorless control system for interior permanent magnet synchronous motors", IET Electric Power Applications vol. 4, No. 4, Apr. 1, 2010 (Apr. 1, 2010), pp. 226-240, XP006035176, ISSN: 1751-8679, DOI: 10.1049/IET-EPA:20090214.

Sidath Diao et al: "A differential algebraic approach for position/speed estimation in PMSM", 2013 International Electric Machines & Drives Conference, May 12, 2013 (May 12, 2013),-May 15, 2013 (May 15, 2013), pp. 1149-1154, XP055078708, DOI: 10.1109/IEMDC.2013.6556304 ISBN: 978-1-46-734973-4.

* cited by examiner

METHOD FOR ESTIMATING THE ANGULAR POSITION OF THE ROTOR OF A POLYPHASE ROTARY ELECTRICAL MACHINE, AND APPLICATION TO THE CONTROL OF A POLYPHASE INVERTER FOR SUCH A MACHINE

CROSS-REFERENCE TO RELATED APPLICATIONS AND CLAIM TO PRIORITY

This application is a national stage application of International Application No. PCT/FR2014/051079 filed May 12, 2014, which claims priority to French Patent Application No. 1354239 filed May 13, 2013, the disclosures of which are incorporated herein by reference and to which priority is claimed.

FIELD OF THE INVENTION

The present invention relates to a method for estimating the angular position/speed of rotation of the rotor of a polyphase synchronous rotary electrical machine, and to control methods and devices for a polyphase inverter which is designed to supply a polyphase synchronous rotary electrical machine from a source of direct voltage.

The invention also relates to a polyphase synchronous rotary electrical machine comprising an inverter integrated in these aforementioned devices, in particular for applications in motor vehicles.

BACKGROUND OF THE INVENTION

Electric drives are becoming increasingly more common in the motor vehicle field, and are fulfilling more and more functions.

Because of their high performance and their high power density, synchronous machines are mostly used in the motor vehicle industry.

These are used in particular in hybrid electric vehicles (HEVs) and electric vehicles (EVs) in the electric power steering, air conditioners and cooling fans of the thermal engines.

FIG. 1 shows schematically an electric drive with a synchronous machine 1. A system of this type also generally comprises:
 a source of energy constituted by a battery 2;
 a static converter constituted by an inverter 3;
 a control unit 4.

An adequate power inverter 3 is required to generate the various voltages of variable frequencies and phase amplitudes from the battery 2.

The synchronous machine carries out the conversion between the electrical energy and the mechanical energy.

As indicated in FIG. 1, measurement sensors (direct voltage supply, phase currents 5 and angular position/speed of rotation 6) associated with a reference 7 (torque or speed) constitute the inputs of the control unit 4 of the system.

FIG. 2 shows schematically, in the case of a three-phase synchronous machine 1, the main elements of the control unit 4 which controls the power electronics of the inverter 3, in order to supply the machine 1 with the correct voltages corresponding to the references.

The purpose of this control unit 4 is to permit functioning with good performance in a wide range of torques and speeds.

For this purpose, closed loop control is necessary.

The current regulation 8 (Current Control Loop—CCL) depends on correction which ensures good control of the phase currents measured at a current reference $i^{ref}$.

A unit for calculation of the current reference 9 provides $i^{ref}$ from the torque/speed reference 7 and the electrical parameters of the machine 1.

It transforms a mechanical reference into an electrical reference.

When the reference voltage $V^{ref}$ has been calculated by the current regulation unit 8, a vectorial pulse width modulation unit 10, or vectorial PWM (Space Vector Modulation—SVM) generates the duty cycles which must be applied to the arms of the inverter 3 from the components of the reference voltage in a Clarke reference.

Next, a power control unit 11 generates the control signals U, V, W used to control the inverter 3.

As far as the current regulation 8 is concerned, since a three-phase system is being used, the control can be analysed in a plurality of references.

The well-known Clarke transformation is a projection of the values relating to the three phases on two fixed axes ($\alpha$, $\beta$). The Clarke transformation is then followed by rotation of the axes, which converts the alternating components of the reference ($\alpha$, $\beta$) into direct components according to a direct axis and an axis in quadrature (reference (d, q)) relative to the magnetic flux produced by the rotor. The combination of the Clarke transformation and the rotation of the reference ($\alpha$, $\beta$) to the reference (d, q) is known by the name of Park transformation.

The main advantage of these transformations is the reduction of the order of the system and decoupling of the control.

The control of machines of this type requires information 6 concerning the angular position and/or the speed of the rotor of the machine. Conventionally, the position/speed information 6 is obtained by one or two measurement sensors, in the knowledge however that a single angular position sensor can generally suffice, taking into account the fact that the speed of rotation can be obtained by calculation of the first derivative relative to the time of the angular position.

In order to reduce the cost of the synchronous machine and its control, it is known from document U.S. Pat. No. 5,569,994 to dispense with the position/speed sensor(s) in order to control the machine. For this purpose, the electromotive forces (emf) generated by the various phase windings of the machine are used in order to estimate the position of the rotor. However, this method according to U.S. Pat. No. 5,569,994 does not provide a satisfactory solution for measurement of the angular position of the rotor at low speed.

Whatever the case, when safe and accurate functioning of the electric drive is required, it is difficult to dispense with the position/speed sensor 14, 15, and the control unit 4 must be tolerant to a deficiency 12, 13 of the position/speed sensor 14, 15. This makes it possible to ensure functioning without interruption and in conformity with the safety requirements.

At present, in the most demanding applications, redundancy of the equipment is used to overcome a sensor malfunction, which makes the system more complex and increases its cost.

Concurrently, software redundancy is far more advantageous because of its capacity for development, as well as its low cost. For this purpose, "software sensors" as they are habitually known, are produced.

These use other available measurements, in particular those provided by current sensors, and other data relating to the control, in order to reconstruct the missing signal.

For example, document U.S. Pat. No. 7,002,318 describes a method and a device for control with malfunction tolerance of a vehicle propulsion system. In the case of failure of the sensor for the angular position of the rotor of the three-phase electric motor with permanent magnets, an estimation of the position is calculated according to the phase currents, and is used by the control device. It will be noted however that this document does not propose any satisfactory solution for a polyphase synchronous rotary electrical machine.

SUMMARY OF THE INVENTION

In view of the highly demanding applications in the very competitive motor vehicle field, the objective of the present invention is consequently to eliminate the control insufficiencies of the prior art for electric drives which use a polyphase synchronous rotary electrical machine.

According to a first aspect, the invention relates to a method for estimating the angular position and/or the speed of rotation of a rotor contained in a polyphase synchronous rotary electrical machine also comprising a stator, the machine being supplied by means of a polyphase inverter connected to a source of direct voltage, and the polyphase inverter being controlled such as to be able to apply vectorial pulse width modulation to the stator. The angular position is estimated by calculating at least one first estimator as the solution of a differential algebraic equation, the coefficients of which depend on electrical parameters of the machine comprising first and second inductances of the stator, respectively according to a direct axis and an axis which is in quadrature relative to a magnetic flux produced by the rotor, a resistance of a phase winding and the magnetic flux produced by the rotor, and additionally dependent on a reference voltage of the vectorial pulse width modulation, phase currents, and first derivatives of the phase currents relative to the time; and the speed of rotation is estimated by calculating a second estimator obtained by calculation of a first derivative of the first estimator relative to the time.

According to the invention, the differential algebraic equation is written in the case when the polyphase synchronous rotary electrical machine is three-phase:

$$\begin{cases} \dot{\hat{\theta}} = \dfrac{\sin\hat{\theta}(L_q \dot{y}_1 + R_s y_1 - u_1) + \cos\hat{\theta}(-L_q \dot{y}_2 - R_s y_2 + u_2)}{\phi_m + (L_d - L_q)(y_1 \cos\hat{\theta} + y_2 \sin\hat{\theta})} \\ \hat{\omega} = \dot{\hat{\theta}} \end{cases}$$

where:
a derivation operator relative to the time is known as ●;
$\hat{\theta}, \hat{\omega}$ represent respectively the first and second estimators;
$u=[u_1, u_2]=[v_{s\alpha}, v_{s\beta}]$ represent components of the reference voltage in a Clarke reference;
$y=[y_1, y_2]=[i_{s\alpha}, i_{s\beta}]$ a represent phase current projections on the Clarke reference;
$L_d, L_d$ represent respectively the first and second inductances;
$R_s$ represents the resistance;
$\Phi_m$ represents the magnetic flux.

According to another characteristic of the method, an initial value of the second estimator is provided by the expression:

$$\theta_0 = \arctan\left(\dfrac{R_s y_2 + L_q \dot{y}_2 - u_2}{R_s y_1 + L_q \dot{y}_1 - u_1}\right)\bigg|_{t=0}$$

According to a second aspect, the invention relates to a method for controlling a polyphase inverter which is designed to supply from a source of direct voltage a polyphase synchronous rotary electrical machine comprising a rotor and a stator, the method being of the type controlling the inverter according to at least one angular position of the rotor and/or a speed of rotation of the rotor.

According to the invention, the angular position and/or the speed of rotation are estimated by calculating first and second estimators according to the estimation method described briefly above.

According to a third aspect, the invention relates to a method for controlling with malfunction tolerance a polyphase inverter which is designed to supply from a source of direct voltage a polyphase synchronous rotary electrical machine comprising a rotor, a stator, a position sensor which determines an angular position of the rotor, and a speed sensor which determines a speed of rotation of the rotor, the method being of the type which controls the inverter according to at least the angular position and the speed of rotation.

According to the invention, at least a first estimator of the angular position and/or a second estimator of the speed of rotation are calculated in the case of failure of at least one of the sensors, the first and second estimators being calculated by means of the method described briefly above.

According to a fourth aspect, the invention relates to a device with malfunction tolerance for a polyphase inverter which is designed to supply a polyphase synchronous rotary electrical machine from a source of direct voltage, this device implementing the method for control with malfunction tolerance described briefly above, the device comprising a rotor, a stator, a position sensor which provides an angular position of the rotor and/or a speed sensor which provides a speed of rotation of the rotor, of the type comprising:
first means for acquisition of the angular position;
second means for acquisition of the speed of rotation;
third means for acquisition of phase currents;
means for estimation of a first estimator of the position and/or a second estimator of the speed of rotation established according to the method described briefly hereinafter;
means for detection of a first failure of the position sensor and/or of a second failure of the speed sensor; and
means for replacement of the angular position by the first estimator and/or of the speed of rotation by the second estimator in the case of detection of a first and/or a second failure by the means for detection.

According to another characteristic, the device for control with malfunction tolerance comprises means for estimation which comprise:
means for storage of electrical parameters of the machine;
means for solving a differential algebraic equation of the first estimator; and
means for differentiation of the first estimator.

According to yet another characteristic, the device for control with malfunction tolerance also comprises:
a current regulator which generates a reference voltage according to a current reference, whilst being connected to the first, second and third means for acquisition, or alternatively to the means for replacement and to the third means for acquisition; and a signal generator which is controlled by the current regulator and implements a vectorial pulse width modulation strategy.

According to another aspect, the invention also relates to a polyphase synchronous rotary electrical machine comprising an inverter provided with the device for controlling with malfunction tolerance as described briefly above.

According to another aspect, the invention also relates to a computer memory comprising computer codes which are representative of the methods for controlling a polyphase inverter as described briefly above.

These few specifications will have made apparent to persons skilled in the art the advantages provided by the methods for controlling a polyphase inverter according to the invention, as well as by the corresponding control device and machine, in comparison with the prior art.

The detailed specifications of the invention are provided in the description which follows in association with the appended drawings. It should be noted that these drawings simply serve the purpose of illustrating the text of the description, and do not constitute in any way a limitation of the scope of the invention.

DETAILED DESCRIPTION OF THE PREFERRED EMBODIMENT(S)

Figure 3:
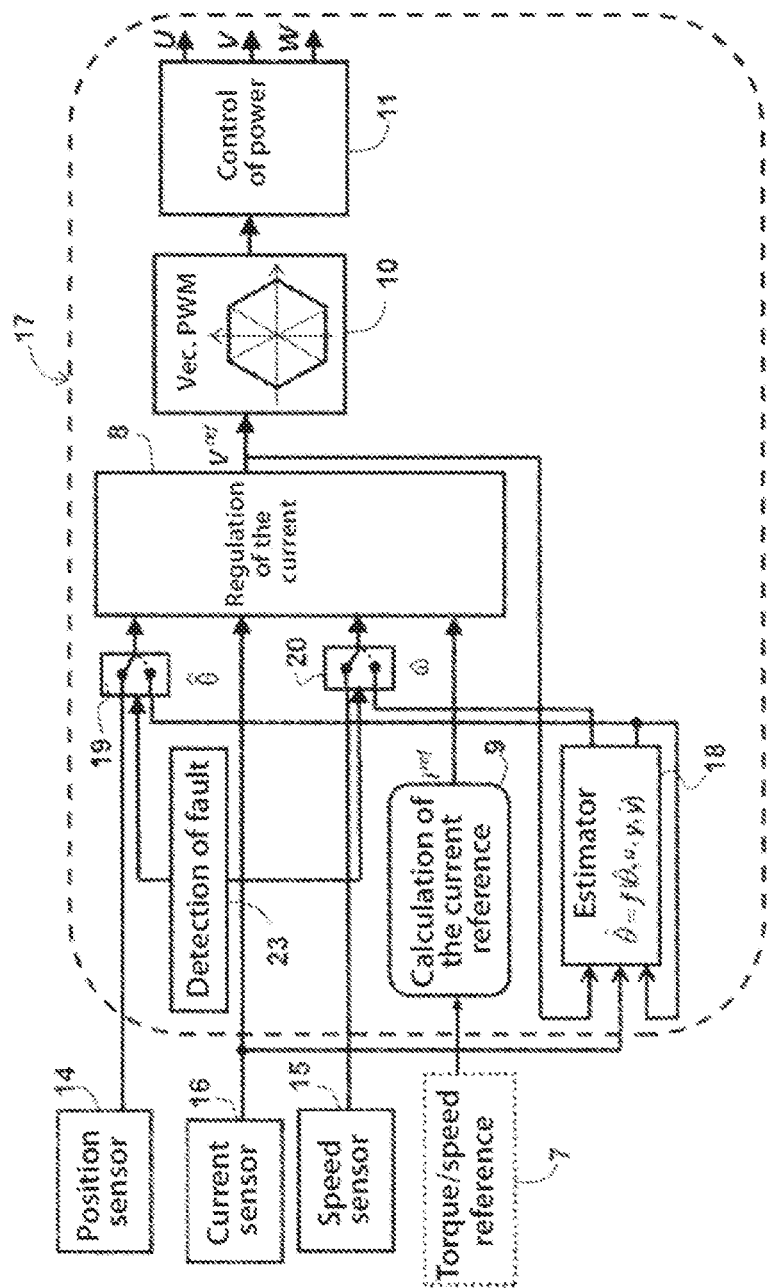
FIG. 3 represents the general structure of a device for controlling with malfunction tolerance according to the invention which can advantageously replace the control unit in FIG. 1.

The invention which will now be described in association with FIG. 3 provides an alternative to the measurements of angular position and speed of rotation.

The method for controlling the inverter 3 uses the phase current measurements 5 provided by current sensors 16, the voltage reference $V^{ref}$ of a vectorial PWM 10, and the electrical parameters of the machine 1 in order to estimate the angular position θ and the speed of rotation ω when the angular position sensor 14 and the sensor for the speed of rotation 15 are faulty.

This input data used by the first and second algebraic estimators $\hat{\theta}, \hat{\omega}$ of the angular position θ and of the speed of rotation co are common to a plurality of known estimators.

However, the invention has low algorithmic complexity in contrast with the other methods, which have a relatively high cost in terms of calculation power which is unsuitable for on-board systems, and it provides relevant estimations $\hat{\theta}, \hat{\omega}$ even in the domain of low speeds of rotation.

FIG. 3 shows schematically, in the case of a three-phase synchronous machine 1, the main elements of the device for controlling with malfunction tolerance 17 which controls the power electronics of the inverter 3 in order to supply the machine 1 with the correct voltages corresponding to the references.

Figure 1:
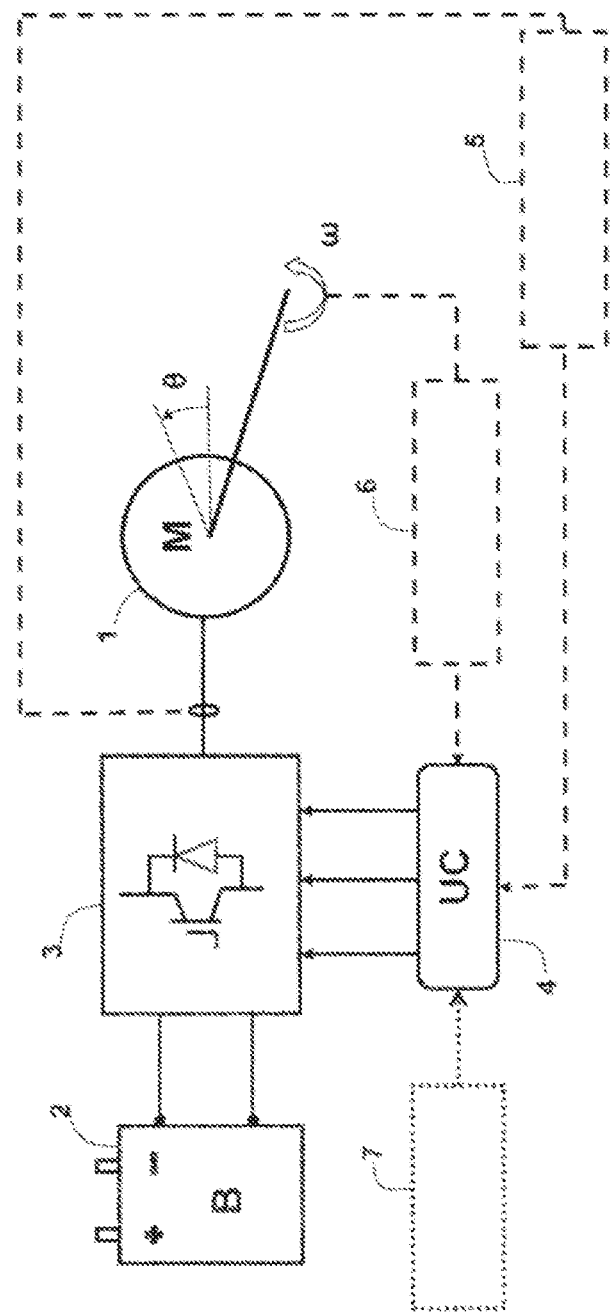
FIG. 1 represents schematically a general electric drive with a rotary electrical machine supplied by an inverter provided with its control unit of the type to which the invention relates.
Figure 2:
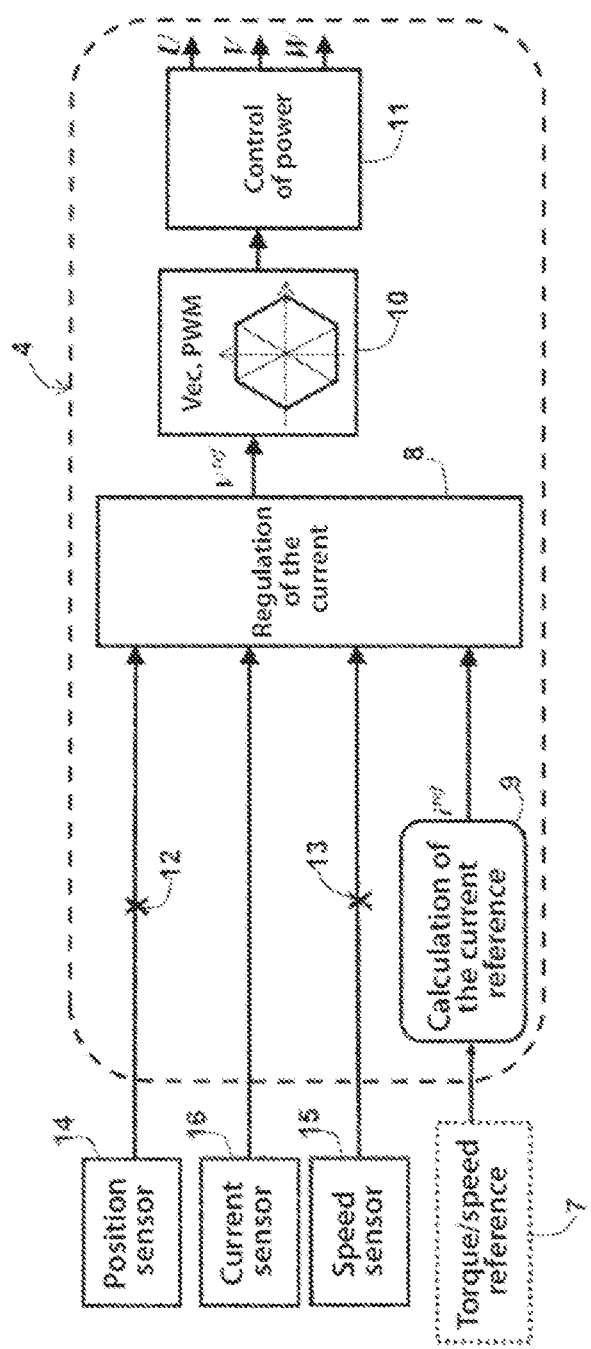
FIG. 2 represents the general structure of the control unit shown in FIG. 1.

As in the conventional implementation of the control unit 4 shown in FIG. 2, the objective of this control device 17 is to permit functioning with good performance in a wide range of torques and speeds; it uses once more the basic elements of the control unit 4.

The current regulation 8 ensures that the phase currents measured are controlled by the current sensors 16 at a current reference $i^{ref}$.

The calculation unit of the current reference 9 provides $i^{ref}$ from the torque/speed reference 7 and the electrical parameters of the machine 1.

When the reference voltage $V^{ref}$ has been calculated by the current regulation unit 8, the vectorial PWM unit 10 generates the duty cycles which must be applied to the arm of the inverter 3 from reference voltage components $V^{ref}$ in a Clarke reference.

The power control unit 11 then generates the control signals U, V, W used in order to control the inverter 3.

As far as the current regulation 8 is concerned, since the preferred embodiments of the invention work with a three-phase system, the control can be analysed as previously in a plurality of references, by means of the Clarke and Park transformations.

The main advantage of these transformations is the reduction of the order of the system and uncoupling of the control.

As shown clearly in FIG. 3, the device for controlling with malfunction tolerance 17 according to the invention comprises, in addition to the known elements of the control unit 4, a unit 18 for estimation of the first estimator of the angular position $\hat{\theta}$ and of the second estimator of the speed of rotation $\hat{\omega}$.

This first estimator of the angular position $\hat{\theta}$ and this second second estimator of the speed of rotation $\hat{\omega}$ are supplied to the current regulation 8 by selectors 19, 20 when the position sensor 14 and the speed sensor 15 are faulty, and no longer supply measurements to the current regulation 8, or when these measurements appear to be erroneous, in terms of offset or amplitude. A device for detection of malfunction 23 is designed to detect the failure of the sensors 14, 15.

It will be noted that the angular position θ and the speed of rotation ω are estimated from the reference voltage $V^{ref}$ and from the measurements of the phase currents 5, which are completely uncorrelated with the position/speed measurements 6. This point is essential for the detection of a failure and a reconfiguration.

The method for control with malfunction tolerance according to the invention is based on the implementation of a differential algebraic equation.

In general, the essential characteristic of this approach is that a value z is said to be "observable" relative to another value w (which is considered to be available in a certain interval of time), if each component $z_i$ of z is a solution of an algebraic equation, the coefficients of which depend on w and on a finite number of its derivatives relative to time, i.e.:

$$\forall i \in \{1, \ldots, n\}, H_i(z_i, w, \dot{w}, \ldots) = 0$$

where $H_i$ is a polynomial equation, and the symbol ● denotes a derivation operator relative to time.

This equation defines the condition of algebraic observability.

The inventive body has advantageously applied this theory to modelling of a three-phase synchronous machine 1 with internal permanent magnets.

A representation of state of the synchronous machine model 1 is used with the following electrical parameters:
first and second inductances $L_d$, $L_q$ of the stator in the reference (d, q);
resistance $R_s$ of the phase windings of the stator;
a magnetic flux $\Phi_m$ produced by the magnets of the rotor.

The input data of the calculation carried out by the estimation unit 18 is:
the components of the reference voltage $V^{ref}$ in a Clarke reference $u=[u_1, u_2]=[v_{s\alpha}, v_{s\beta}]$;
the projections of the phase currents 5 on this same Clarke reference $y=[y_1, y_2]=[i_{s\alpha}, i_{s\beta}]$.

The expressions of the first and second estimators are then obtained as a solution of a differential algebraic equation, the coefficients of which depend on the electrical parameters of the machine 1, on the reference voltage $V^{ref}$, and on the currents measured and their first derivatives relative to time:

$$\begin{cases} \dot{\hat{\theta}} = \dfrac{\sin\hat{\theta}(L_q \dot{y}_1 + R_s y_1 - u_1) + \cos\hat{\theta}(-L_q \dot{y}_2 - R_s y_2 + u_2)}{\phi_m + (L_d - L_q)(y_1 \cos\hat{\theta} + y_2 \sin\hat{\theta})} \\ \dot{\hat{\omega}} = \dot{\hat{\theta}} \end{cases}$$

The initial value $\theta_0$ of the first estimator $\hat{\theta}$ is determined from this first expression, considering that the speed of rotation $\omega$ is zero at the instant $t=0$:

$$\theta_0 = \arctan\left(\dfrac{R_s y_2 + L_q \dot{y}_2 - u_2}{R_s y_1 + L_q \dot{y}_1 - u_1}\right)\bigg|_{t=0}$$

It will be noted that $\dot{y}_1$, $\dot{y}_2$ can be calculated by means of an approximation of the finite differences.

Several tests were carried out successfully by the inventive body for the purpose of validating the accuracy of the estimations.

A first test was carried out on a low-power bench (approximately 1.1 kW). The synchronous machine 1 used had a nominal speed of 2000 rpm and an initial torque of 1.5 Nm with a salience ratio of 1.28. The machine 1 was tested both in loaded conditions and in the absence of a load.

The experimental results in the domain of the low speeds of rotation (up to 200 rpm) are presented in FIGS. 4a, 4b, 5a and 5b.

Figure 4A:
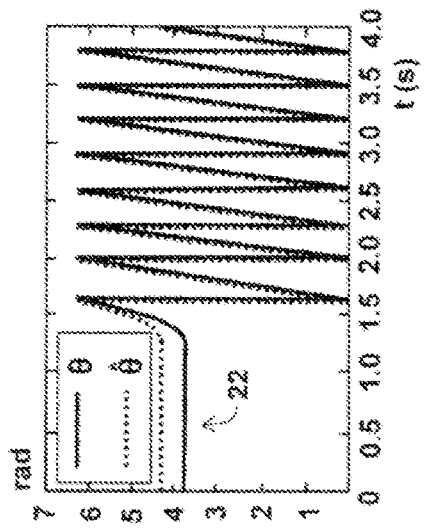
FIGS. 4a and 4b and FIGS. 5a and 5b are comparisons between the estimations provided by the control method with malfunction tolerance according to the invention and, respectively, the speeds of rotation and the real angular positions.

FIG. 4a shows the development of the first estimator according to time (in a broken line) and the development of the speed of rotation measured (in a solid line). It is found that these curves are virtually superimposed in a steady state 21 after the transient phase 22.

Figure 4B:
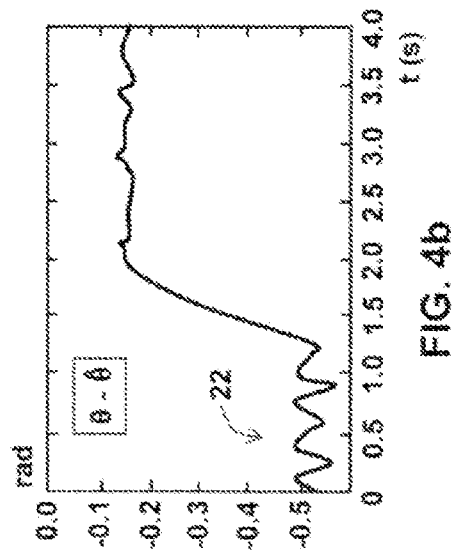

FIG. 4b which shows the estimation error confirms this fact, since a first error is almost zero in a steady state 21 and a maximum of 2.5% in the transient phase 22.

Figure 5A:
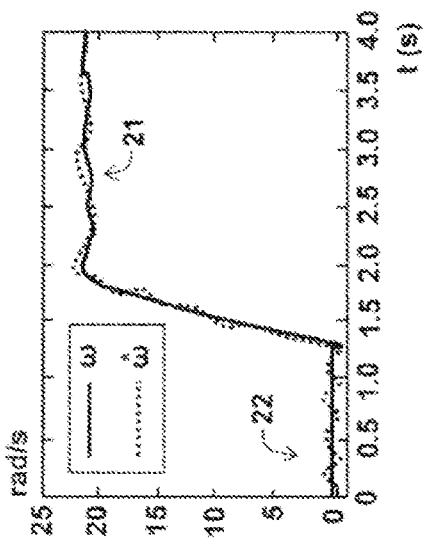
Figure 5B:
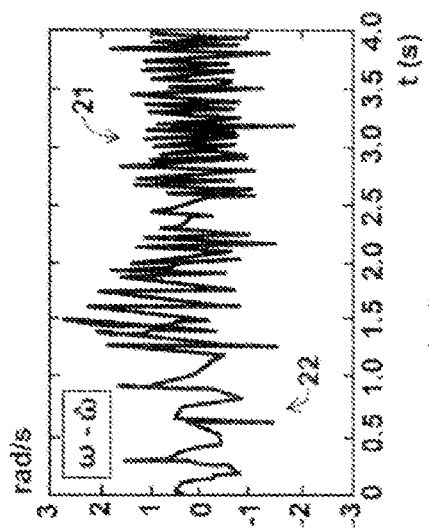

With reference to the second estimator, the development of which according to time (in a broken line) is shown in FIG. 5a, a substantial difference of 0.53 rd compared with the development of the real angular position (in a solid line) can be noted during starting 22. As shown clearly in FIG. 5b, the second estimator converges towards a stable value when the rotor begins to rotate, with a second slight error of 0.15 rd.

The oscillations at low speed are caused mainly by low accuracy of the phase current measurements 5.

It will be appreciated that the invention is not limited simply to the above-described preferred embodiments.

The preferred embodiments of the method and device for control with malfunction tolerance according to the invention described above relate to a three-phase synchronous machine comprising a rotor with permanent magnets.

The magnetic flux of the rotor could also be produced entirely or partly by rotor windings.

Nor does the invention relate solely to three-phase machines 1.

Modelling of a polyphase synchronous machine 1 comprising a number of phases more than three, by means of a differential algebraic equation in order to construct first and second position/speed estimators would make it possible to produce another device for control with malfunction tolerance of the inverter 3 supplying this machine 1, which would have the same advantages as the above-described control device.

In particular, in the case of a hexaphase machine of the double three-phase type, the analysis of which is known to be able to be broken down into the analysis of two offset three-phase systems, the first and second estimators would be similar to those, the expressions of which are given above for a three-phase synchronous machine 1.

As a result of the low algorithmic complexity of the control method according to the invention, it can easily be implemented in the form of instructions programmed or micro-programmed in a memory of a microprocessor or microcontroller.

The invention thus incorporates all the possible variant embodiments, provided that these variants remain within the scope defined by the following claims.

The invention claimed is:

1. Method for estimating the angular position and/or the speed of rotation of a rotor contained in a polyphase synchronous rotary electrical machine (1) also comprising a stator, said machine being supplied by means of a polyphase inverter (3) connected to a source of direct voltage (2), and said polyphase inverter (3) being controlled such as to be able to apply (11) vectorial pulse width modulation (10) to said stator, said angular position estimation being obtained by calculating at least one first estimator as the solution of a differential algebraic equation, the coefficients of which depend on electrical parameters of said machine (1) comprising first and second inductances of said stator, respectively according to a direct axis and an axis which is in quadrature relative to a magnetic flux produced by said rotor, a resistance of a phase winding and said magnetic flux produced by said rotor, and additionally dependent on a reference voltage of said vectorial pulse width modulation (10), phase currents (5), and first derivatives relative to the time of said phase currents (5), and said speed of rotation being estimated by calculating a second estimator obtained by calculation of a first derivative of said first estimator relative to the time;

wherein said differential algebraic equation is written in the case when said polyphase synchronous rotary electrical machine (1) is three-phase:

$$\begin{cases} \dot{\hat{\theta}} = \dfrac{\sin\hat{\theta}(L_q \dot{y}_1 + R_s y_1 - u_1) + \cos\hat{\theta}(-L_q \dot{y}_2 - R_s y_2 + u_2)}{\phi_m + (L_d - L_q)(y_1 \cos\hat{\theta} + y_2 \sin\hat{\theta})} \\ \dot{\hat{\omega}} = \dot{\hat{\theta}} \end{cases}$$

where:
a derivation operator relative to the time is known as ●;

$\hat{\theta}$, $\hat{\omega}$ represent respectively said first and second estimators;

$u=[u_1, u_2]=[v_{s\alpha}, v_{s\beta}]$ represent components of said reference voltage in a Clarke reference;

$y=[y_1, y_2]=[i_{s\alpha}, i_{s\beta}]$ represent projections of said phase currents (5) on said Clarke reference;

$L_q$, $L_d$ represent respectively said first and second inductances;

$R_s$ represents said resistance;

$\Phi_m$ represents said magnetic flux.

2. Method according to claim 1, wherein an initial value of said second estimator is provided by the expression:

$$\theta_0 = \arctan\left(\frac{R_s y_2 + L_q \dot{y}_2 - u_2}{R_s y_1 + L_q \dot{y}_1 - u_1}\right)\bigg|_{t=0}.$$

3. Method for controlling a polyphase inverter (3) which is designed to supply from a source of direct voltage (2) a polyphase synchronous rotary electrical machine (1) comprising a rotor and a stator, said method being of the type controlling said inverter (3) according to at least one angular position of said rotor and/or a speed of rotation of the rotor, wherein said angular position and/or said speed of rotation are estimated by calculating first and second estimators in accordance with the method according to claim 2.

4. Method for controlling with malfunction tolerance a polyphase inverter (3) which is designed to supply from a source of direct voltage (2) a polyphase synchronous rotary electrical machine (1) comprising a rotor, a stator, a position sensor (14) which determines an angular position of said rotor, and a speed sensor (15) which determines a speed of rotation of said rotor, the method being of the type which controls said inverter (3) according to at least said angular position and said speed of rotation, wherein at least a first estimator of said angular position and/or a second estimator of said speed of rotation are calculated in the case of failure of at least one of said sensors (14, 15), said first and second estimators being calculated in accordance with the method according to claim 2.

5. Method for controlling a polyphase inverter (3) which is designed to supply from a source of direct voltage (2) a polyphase synchronous rotary electrical machine (1) comprising a rotor and a stator, said method being of the type controlling said inverter (3) according to at least one angular position of said rotor and/or a speed of rotation of the rotor, wherein said angular position and/or said speed of rotation are estimated by calculating first and second estimators in accordance with the method according to claim 1.

6. Computer memory, wherein it comprises computer codes for execution of the steps of the method for controlling a polyphase inverter (3) according to claim 5.

7. Method for controlling with malfunction tolerance a polyphase inverter (3) which is designed to supply from a source of direct voltage (2) a polyphase synchronous rotary electrical machine (1) comprising a rotor, a stator, a position sensor (14) which determines an angular position of said rotor, and a speed sensor (15) which determines a speed of rotation of said rotor, the method being of the type which controls said inverter (3) according to at least said angular position and said speed of rotation, wherein at least a first estimator of said angular position and/or a second estimator of said speed of rotation are calculated in the case of failure of at least one of said sensors (14, 15), said first and second estimators being calculated in accordance with the method according to claim 1.

8. Device for controlling with malfunction tolerance (17) a polyphase inverter (3) which is designed to supply a polyphase synchronous rotary electrical machine (1) from a source of direct voltage (2), said device comprising a rotor, a stator, a position sensor (14) which provides an angular position of said rotor and/or a speed sensor (15) which provides a speed of rotation of said rotor, comprising:

first means (6) for acquisition of said angular position;
second means (6) for acquisition of said speed of rotation;
third means (5) for acquisition of phase currents;
means (18) for estimation of a first estimator of said position and/or a second estimator of said speed of rotation;
means (23) for detection of a first failure of said position sensor (14) and/or of a second failure of said speed sensor (15); and
means (19, 20) for replacement of said angular position by said first estimator and/or of said speed of rotation by said second estimator in the case of detection of a first and/or a second failure by said means (23) for detection.

9. Device for controlling with malfunction tolerance (17) a polyphase inverter (3) according to claim 8, wherein said means (18) for estimation comprise:

means for storage of electrical parameters of said machine (1);
means for solving a differential algebraic equation of said first estimator;
means for differentiation of said first estimator.

10. Device for controlling with malfunction tolerance (17) a polyphase inverter (3) according to claim 9, wherein it also comprises:

a current regulator (8) which generates a reference voltage according to a current reference, whilst being connected to the first, second and third means (5, 6) for acquisition, or alternatively to the means (19, 20) for replacement and to said third means (5) for acquisition;
a signal generator (10) which is controlled by said current regulator (8) and implements a vectorial pulse width modulation strategy.

11. Polyphase synchronous rotary electrical machine (1), wherein it comprises an inverter provided with the device for controlling with malfunction tolerance (17) a polyphase inverter (3) according to claim 9.

12. Device for controlling with malfunction tolerance (17) a polyphase inverter (3) according to claim 8, wherein it also comprises:

a current regulator (8) which generates a reference voltage according to a current reference, whilst being connected to the first, second and third means (5, 6) for acquisition, or alternatively to the means (19, 20) for replacement and to said third means (5) for acquisition;
a signal generator (10) which is controlled by said current regulator (8) and implements a vectorial pulse width modulation strategy.

13. Polyphase synchronous rotary electrical machine (1), wherein it comprises an inverter provided with the device for controlling with malfunction tolerance (17) a polyphase inverter (3) according to claim 12.

14. Polyphase synchronous rotary electrical machine (1), wherein it comprises an inverter provided with the device for controlling with malfunction tolerance (17) a polyphase inverter (3) according to claim 8.

* * * * *